United States Patent [19]
Johnson

[11] Patent Number: 5,971,353
[45] Date of Patent: Oct. 26, 1999

[54] DUMP/STOP VALVE FOR SURFACE CONTROLLED SUBSURFACE SAFETY VALVE

[75] Inventor: Clarence William Johnson, Calgary, Canada

[73] Assignee: Barber Industries, Inc., Calgary, Canada

[21] Appl. No.: 08/988,849

[22] Filed: Dec. 11, 1997

Related U.S. Application Data

[63] Continuation-in-part of application No. 08/641,988, Apr. 9, 1996.

[51] Int. Cl.$^6$ .................................................. F16K 31/122
[52] U.S. Cl. ...................... 251/63.6; 251/62; 137/625.66
[58] Field of Search ................... 251/63.5, 63.6, 251/26, 63, 25, 62; 137/625.6, 625.66; 91/432, 468

[56] References Cited

U.S. PATENT DOCUMENTS

| 4,307,654 | 12/1981 | De Almeida | 251/63.6 X |
|---|---|---|---|
| 4,491,154 | 1/1985 | Peters | 137/625.66 |
| 4,597,719 | 7/1986 | Tano | 251/63.6 X |

OTHER PUBLICATIONS

"Sigma Enterprises Inc." brochure. 3 page brochure. 1995.

*Primary Examiner*—Kevin Lee
*Attorney, Agent, or Firm*—John Russell Uren

[57] ABSTRACT

Dump/stop valve to regulate the time delay between the closure of a surface controlled subsurface safety valve and a surface controlled surface valve. Fluid is applied to a first cavity above a pilot plunger which maintains the subsurface safety valve in an open configuration. In the event the surface safety valve is intended to be closed, the fluid within the first cavity is bled off by a control circuit which immediately closes the surface safety valve. The pilot plunger responds by allowing the subsurface safety valve to be closed a predetermined and consistent time period thereafter.

3 Claims, 4 Drawing Sheets

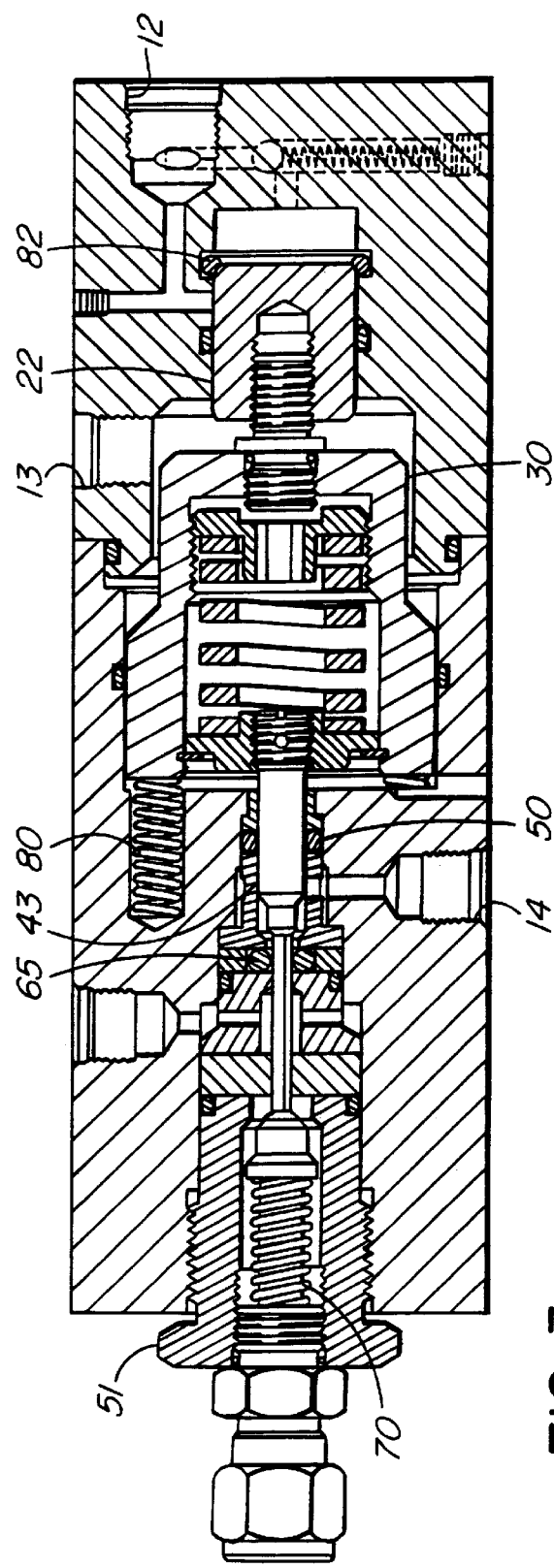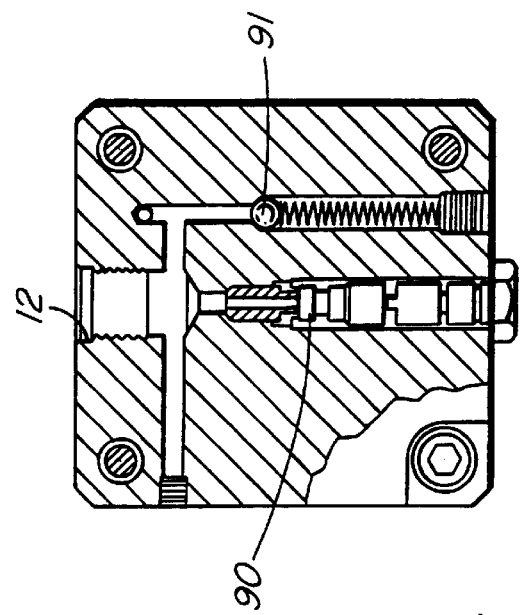
FIG. 3
FIG. 4

DUMP/STOP VALVE FOR SURFACE CONTROLLED SUBSURFACE SAFETY VALVE

CROSS-REFERENCE TO RELATED APPLICATION

This application is a continuation-in-part of pending application Ser. No. 08/641,988 filed Apr. 9, 1996.

INTRODUCTION

This invention relates to a dump/stop valve and, more particularly, to a dump/stop valve used with a surface controlled subsurface safety valve ("SCSSV").

Valves for controlling the closing of down hole safety valves are well known. In response to a loss of pressure in a control circuit, such valves open to allow the fluid holding the subsurface valve open to drain and thereby allow the subsurface safety valve to close which will prohibit fluid from escaping from the well. The prior art valves known, however, have disadvantages.

One disadvantage is that such valves generally serve only one function; that is, one valve may be used for dumping the oil from the subsurface valve and another valve may be used to prohibit oil from escaping from the subsurface safety valve after closure so that leakage through the valve does not find its way to the reservoir which could otherwise flood it. The replication of apparatus is costly and inefficient. Similarly, if the down hole safety valve is used with a surface valve, the proper closing sequence of the two valves is important so that resultant damage to the downhole valve is prevented. This will generally require two control circuits, one for each safety valve. It is important that the two control circuits each individually be used to close the subsurface safety valve. This is to ensure the proper closing sequence of the surface and subsurface valves.

A safety valve actuator circuit used for properly closing a subsurface valve in sequence after the closure of a surface safety valve is described and illustrated in our U.S. patent application Ser. No. 08/478,217 entitled SAFETY VALVE CONTROLLER METHOD AND APPARATUS filed Jun. 7, 1995, the contents of which are hereby incorporated by reference. The dump/stop valve according to the present invention is used with such a circuit taught in the aforementioned patent application.

SUMMARY OF THE INVENTION

According to one aspect of the invention, there is provided a dump/stop valve comprising a pilot plunger movable within a valve body, a first cavity positioned between said pilot plunger and said valve body, a first port operably connected with said first cavity, said first port being operably connected with said cavity through a one-way valve and further being operably connected with said cavity though an adjustable metering orifice, said adjustable metering orifice being operable to release fluid from said first cavity at a predetermined rate of flow from said first port, a valve plunger operably connected with said pilot plunger and being movable relative to said pilot plunger, a second cavity located between a high pressure port and said valve plunger, a reservoir port operably connected with said high pressure port downstream of said second cavity and a seal to seal said reservoir port from said high pressure port, said seal being operably engaged with said valve plunger.

BRIEF DESCRIPTION OF THE SEVERAL VIEWS OF THE DRAWINGS

A specific embodiment of the invention will now be described, by way of example only, with the use of drawings in which:

FIG. 3 is a cross-sectional view similar to FIGS. 1 and 2 but illustrating the configuration of the dump/stop valve when the surface safety valve is closed and the subsurface safety valve is closing but may not yet be fully closed and the stop valve is beginning to close;

FIG. 4 is an end view of the dump/stop valve of FIGS. 1–3 illustrating the flow restrictor and check valve.

DESCRIPTION OF SPECIFIC EMBODIMENT

Figure 1:
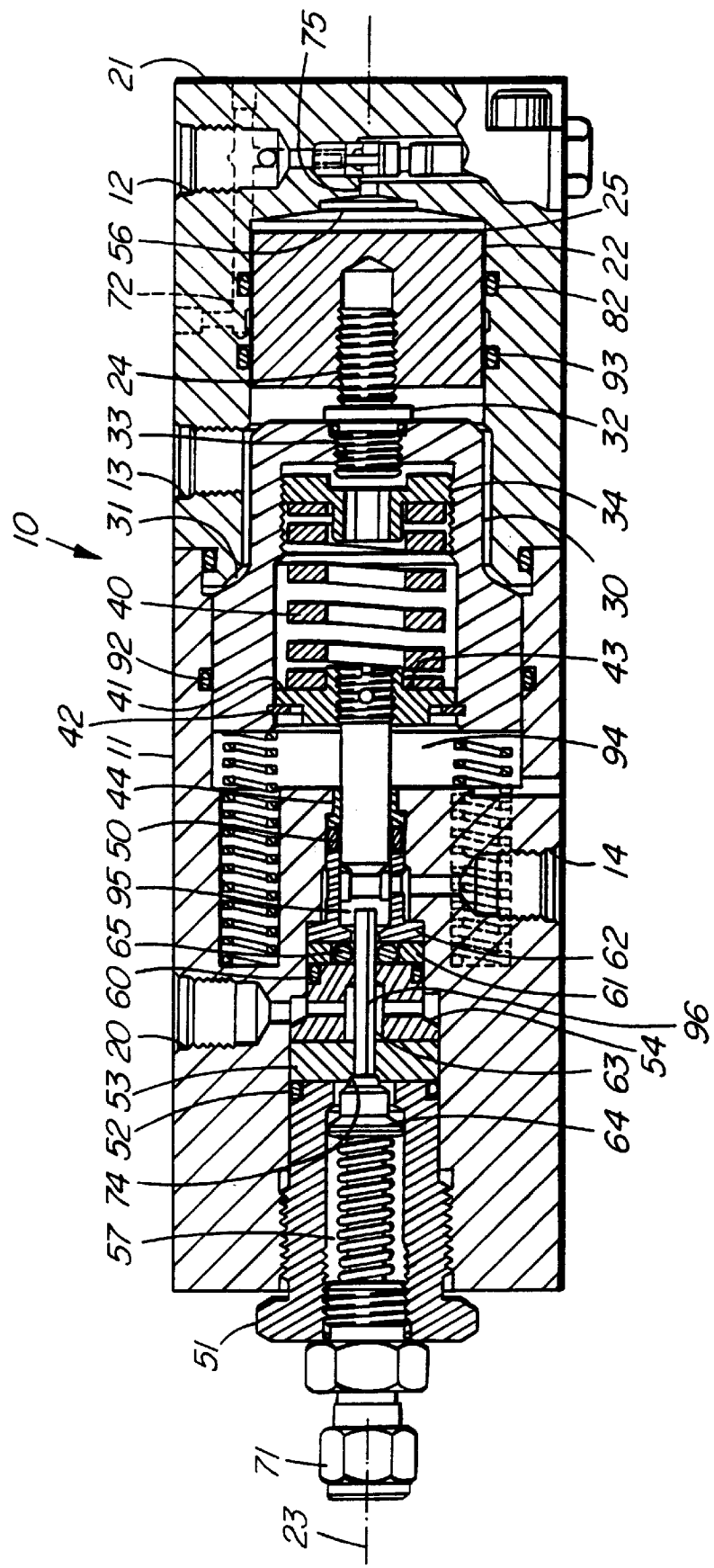
FIG. 1 is a cross-sectional view of a dump/stop valve according to the present invention in a first configuration illustrated when both the surface and subsurface safety valves are in their closed positions and the stop valve is closed.

Referring now to the drawings, a dump/stop valve according to the present invention is generally illustrated at 10 in FIG. 1. It comprises a body 11 and a cover subassembly 21, each having a plurality of ports therein. First port 12 in cover subassembly 21 is connected to the operating circuit of a surface safety valve actuator (not illustrated). Second port 13 in cover subassembly 21 is connected to a first control circuit of the subsurface safety valve (not illustrated). A third port 14 in the body 11 is the exhaust or reservoir port and fourth port 20 in the body 11 is the inlet port from a pressure source (not illustrated) which provides the fluid to maintain the subsurface safety valve in its open and operating condition.

A second pilot plunger 22 is operably mounted within the cover subassembly 21 and reciprocates along the longitudinal axis 23 of the dump/stop valve 10. An adjustment screw 24 is threadedly engaged within second pilot plunger 22 and is adjustable relative thereto.

A second chamber 25 is defined by the volume between the second pilot plunger 22 and the cover subassembly 21.

A first pilot plunger 30 is mounted for movement along longitudinal axis 23 within a first cavity or chamber 31 within the body 11 and the cover subassembly 21. A plug 32 is threadedly mounted into an opening 33 in first pilot plunger 30 and an adjustment nut 34 is threadedly mounted within first pilot plunger 30.

A second spring 40 is also mounted within first pilot plunger 30 and extends between the adjustment nut 34 and a spring retainer 41 held in position by a retainer ring 42. A valve plunger 43 is threadedly mounted within the spring retainer 41. It extends leftwardly as illustrated into sealing relationship with a valve plunger guide 44 and fifth seal or o-ring 50.

An end plug 51 is threadedly inserted into the body 11 and an o-ring 52 surrounds the end plug 51. A seat 53 extends between the end plug 51 and a seat nozzle 54. O-ring 60 surrounds the seat nozzle 54 and abuts the body 11 as is illustrated.

A shroud ring 61 is positioned between the seat nozzle 54 and a cage 62 and a fourth seal or o-ring 65 is positioned between the seat nozzle 54 and the cage 62.

A push rod 63 in the form of a hollow split pin is slidably mounted between a poppet subassembly 64 and a fitting 71 operably inserted into the end plug 51.

A first passageway 72 extends from second cavity 25 occupied by the second pilot plunger 22. First passageway 72 connects with first port 12. A second passageway 75 extends from second cavity 25 and also connects with first port 12 via a flow restrictor 90 and a check valve 91 (FIG. 4).

A series of seals, conveniently o-rings, define a plurality of cavities or chambers within the dump/stop valve 10. Second seal or o-ring 82 defines a second chamber 25. Sixth seal or o-ring 92 and seventh seal or o-ring 93 define first chamber 31. Fifth seal or o-ring 50 and o-ring 92 define a sixth chamber 94. Fourth seal or o-ring 65 and o-ring 50 define a fourth chamber 95 operably connected with port 14. Third seal or seat 74 and o-ring 65 define a third cavity or chamber 96. A fifth chamber 97 is defined at one end by seal 74.

Poppet subassembly 64 is movable within fifth chamber 97 and is operably connected with the SCSSV.

OPERATION

In operation, it will be assumed that both the surface and subsurface safety valves are in their open configuration and that both valves are being held open by hydraulic fluid pressure. The dump/stop valve 10 will be in the configuration illustrated in FIG. 2. It is now desired to close both valves in order to properly sequence the valve shutdown in the event of a leak or other disorder.

Figure 2:
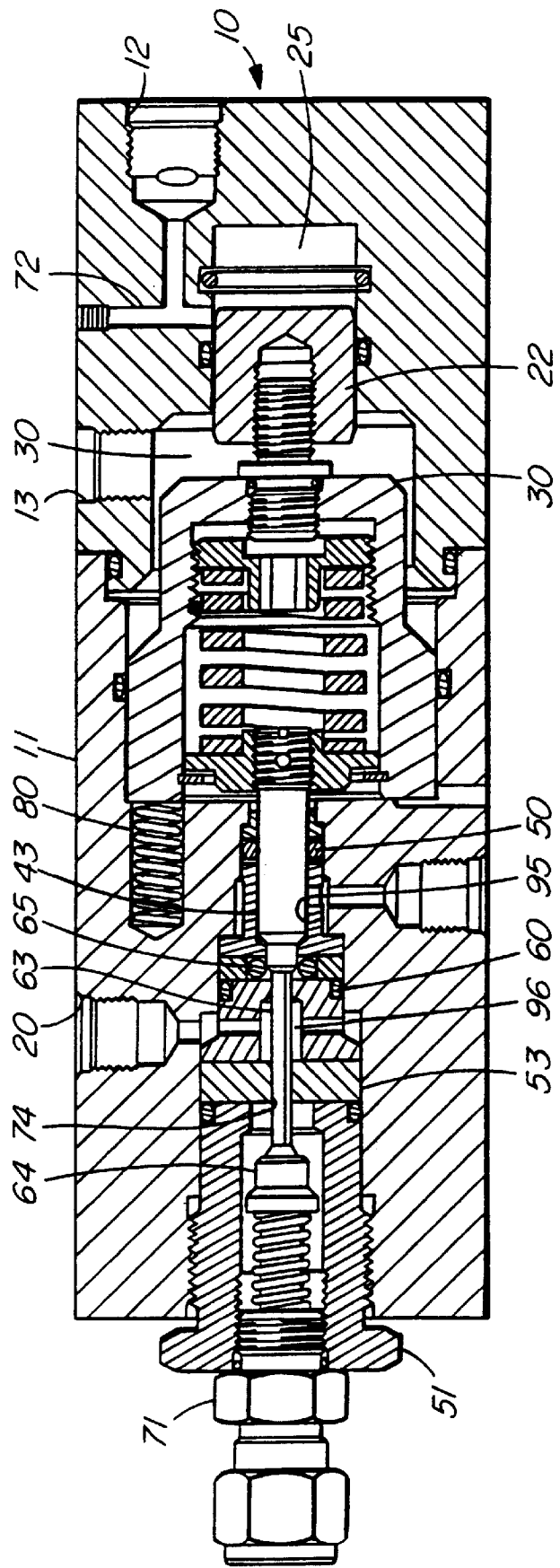
FIG. 2 is a cross-sectional view similar to FIG. 1 but illustrating the configuration of the dump/stop valve when both the surface and subsurface safety valves are in their open conditions and the stop valve is full open.

In such an open condition, the dump/stop valve 10 will be in a configuration as illustrated in FIG. 2; that is, the poppet subassembly 64 will be off the seat 74 in seat 53 and valve plunger 43 will be in contact with o-ring 65. Hydraulic fluid supplied to the subsurface safety valve through port 20 will pass by the push rod 63 and through the end plug 51 and fitting 71 to the surface controlled subsurface safety valve (SCSSV) (not illustrated) down hole. The valve plunger 43 will be in contact with the pushrod 63 and first pilot plunger 30 will be in contact with the body 11 as is illustrated with compression springs 80 likewise in a compressed condition.

It will now be assumed that the SCSSV and the surface safety valve (SSV) (not shown) must be closed. It is necessary to initially close the SSV to stop flow from the well and thus avoid damage or unnecessary wear to the downhole valve which is expensive and difficult to service. Accordingly, a control circuit drains pressure from chamber 31. Simultaneously, the fluid holding the SSV open is allowed to drain permitting the SSV to close.

The fluid pressure holding the SSV open also is connected to port 12 and to an accumulator in which a volume of the fluid is stored at system pressure. The fluid stored under pressure in this accumulator is released slowly into the depressured SSV system via an adjustable needle and orifice thus holding pressure on second pilot plunger 22 for some time after pressure has been drained from the SSV.

When there is no longer any pressure on port 12, springs 80 will push first and second pilot plungers 22, 30 rightwardly until, as shown in FIG. 3, second pilot plunger 22 comes into sealing engagement with second sealing means or o-ring 82.

Fluid in the cavity between the rightwardly of second pilot plunger 22 can no longer pass through passageway 72 into port 12 and must now exit only through passageway 75 and the restriction created by the orifice and tapered metering screw 90 (FIG. 4).

This slows rightward movement of pushrod 63, valve plunger 43 and first and second pilot plungers 30, 22, respectively, thereby permitting the SCSSV operating circuit to be completely drained before the ball of poppet subassembly 64 contacts seat 74 as shown in FIG. 1 to prevent further egress of fluid thus preventing a continued flow of well fluids which would otherwise occur if the seals in the SCSSV were leaking. This function defines the stop action of the dump/stop valve.

If it is now desired to open the SCSSV and SSV, the SCSSV will be opened first. Again, this is desirable to prevent undue damage to the downhole SCSSV. Pressure will be provided at port 13 which will move first pilot plunger 30 leftwardly until it contacts the body 11 as illustrated in FIG. 2. Thereafter, the high pressure pump (not illustrated) will be activated and pressure will be applied at port 20. O-ring 65 will prevent fluid from passing from third chamber 96 to fourth chamber 95 and the pushrod 63 will move leftwardly and the pressure will be applied through the end plug 51 and fitting 71 until the SCSSV is fully open. The high pressure fluid, subsequently used to open the SSV, will likewise be applied to port 12 thereby creating a high pressure condition in the second chamber 25 rightwardly of the second pilot plunger 22 forcing second pilot plunger 22 leftwardly into engagement with first pilot plunger 30 as illustrated in FIG. 2. The dump/stop valve is now ready for a closing operation as described.

A filter 56 (FIG. 1) may conveniently be positioned between the port 12 and the second chamber 25.

Figure 5:
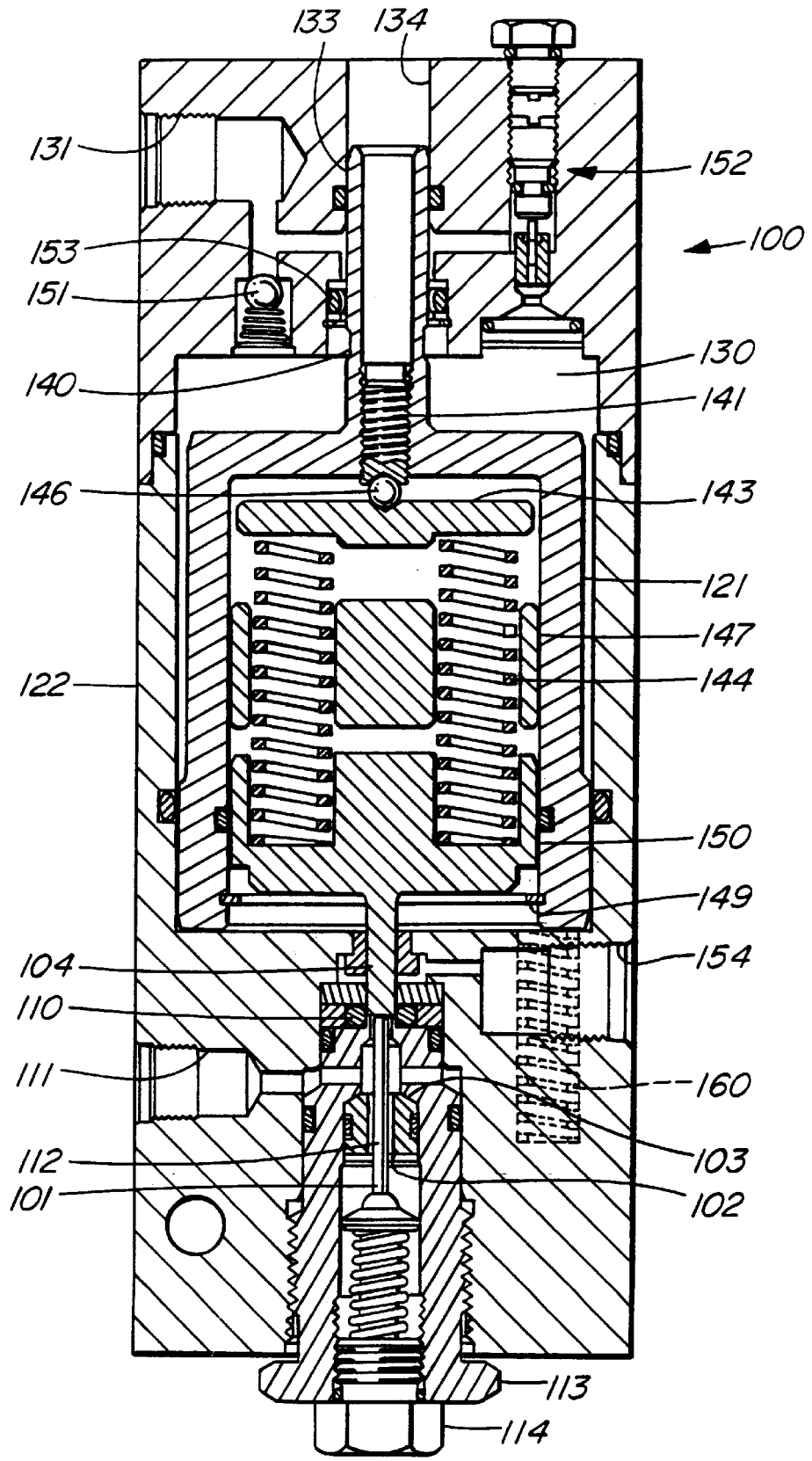
FIG. 5 is a cross-sectional view of a dump/stop valve according to a further embodiment of the invention.

A further embodiment of the invention is illustrated in FIG. 5. In this embodiment, the accumulator used with the embodiment of FIGS. 1–4 is eliminated which allows the time delay between the closure of the surface safety valve and the subsurface safety valve to be more consistent since the closure of the subsurface safety valve will take place a certain and predetermined time following the closure of the surface safety valve independent of the oil volume pumped into the accumulator by the operator. The embodiment of FIG. 5 also allows external access to the spring adjustment screw used for internal spring adjustment so as to set the control line pressure at which the valve relieves excess pressure in the SCSSV whereas in the embodiment of FIGS. 1–4, the adjustment was only possible with considerable disassembly of the dump/stop valve.

Reference is made to FIG. 5 wherein a dump/stop valve according to a further embodiment of the invention is generally illustrated at 100. It comprises a first pilot plunger 121 having an upper extension 133 which is movable within a passageway 134. Extension 133 has a circumferential recess 140. A movable adjustment screw 141 is threadedly mounted within the interior of extension 133 and acts on a ball 146 interposed between the adjustment screw 141 and a first spring plate 143 mounted for axial movement within first pilot plunger 121. A plurality of compression springs 144 are positioned about the circumference of spring plate 143 and extend through a spring guide 147 used to prevent spring buckling and twisting. A spring compression plug 150 is positioned so as to accommodate the opposite end of the plurality of compression springs 144. A retaining ring 149 retains the spring compression plug 150 within pilot plunger 121 and a valve plunger 104 extends from the end of spring compression plug 150 so as to be in operable contact with a pushrod 112 of a poppet subassembly 101.

A first port 131 allows access by control pressure fluid to the chamber 130 between the pilot plunger 121 and the body 122 of the dump/stop valve 100 through a one way valve 151. Fluid egress from the chamber 130 is provided by an adjustable metering orifice generally illustrated at 152 which is adjusted to control flow rate of fluid from the chamber 130 to first port 131. Unrestricted fluid egress is also provided by the circumferential recess 140 when the recess 140 reaches the position of seals 153 as will be explained.

A second port 111 allows high pressure fluid to be applied to maintain the surface controlled subsurface safety valve (SCSSV) in its open position when the poppet subassembly is out of contact with seal 102 and valve plunger 104 is in contact with o-ring 110. Port 154 allows egress of the high pressure fluid to reservoir when the valve plunger 104 is out of contact with o-ring 110.

An end plug 113 and a fitting 114 within the end plug 113 allow access to the downhole surface controlled subsurface safety valve (not illustrated).

In operation, the poppet subassembly 101 is out of contact with seat 102 in seal 103 and valve plunger 104 is in contact with o-ring 110 as seen in FIG. 5. Hydraulic fluid supplied to the subsurface safety valve (SCSSV) (not illustrated) through port 111 will pass by the pushrod 112 and through the end plug 113 and fitting 114 to the surface controlled subsurface safety valve (SCSSV) downhole. The valve plunger 104 will be in contact with the pushrod 112 and first pilot plunger 121 will be in contact with body 122 with compression springs 144 in a compressed position as is illustrated in FIG. 5.

It will now be assumed that the SCSSV and the SSV must be closed. It is necessary to, first, close the SSV to stop flow from the well and thus avoid unnecessary damage or wear to the downhole valve which is expensive and more difficult to service. Accordingly, a control circuit drains fluid from port 131.

As the fluid flows out of chamber 130 through metering valve 152, the pilot plunger 121 moves slowly upwardly under the influence of compression springs 144, 160.

Compression springs 144 hold valve plunger 104 in contact with o-ring 110 until the recess 140 in upper extension 133 reaches the seals 153. The fluid will then exhaust through port 131 thereby allowing pilot plunger 121 to move quickly upwardly. When movement of pilot plunger 121 relative to spring compression plug 150 is stopped by retaining ring 149, valve plunger 104 will move upwardly with pilot plunger 121 and open the passageway to port 154 so as to allow the SCSSV to close more quickly.

While a specific embodiment of the invention has been described, such description should be taken as illustrative of the invention only and not as limiting its scope as defined in accordance with the accompanying claims.

I claim:

1. Dump/stop valve comprising a pilot plunger movable within a valve body, a first cavity positioned between said pilot plunger and said valve body, a first port operably connected with said first cavity, said first port being operably connected with said cavity through a one-way valve and further being operably connected with said cavity through an adjustable metering orifice, said adjustable metering orifice being operable to release fluid from said first cavity at a predetermined rate of flow from said first port, a valve plunger operably connected with said pilot plunger and being movable relative to said pilot plunger, a second cavity located between a high pressure port and said valve plunger, a reservoir port operably connected with said high pressure port downstream of said second cavity and a seal to seal said reservoir port from said high pressure port, said seal being operably engaged with said valve plunger.

2. Dump/stop valve as in claim 1 and further comprising springs operably disposed between said valve plunger and said pilot plunger and further comprising an adjustment member operable to vary the force in said springs between said valve plunger and said pilot plunger.

3. Dump/stop valve as in claim 2 wherein said pilot plunger includes an extension and further comprising a seal operably mounted about said extension and a recess in said extension movable relative to said seal.

* * * * *